US006549891B1

(12) United States Patent
Rauber et al.

(10) Patent No.: US 6,549,891 B1
(45) Date of Patent: Apr. 15, 2003

(54) METHOD FOR MANAGING INVENTORY

(75) Inventors: Brett Alan Rauber, Independence, MO (US); Louis D. Pack, Prairie Village, KS (US); Blaine Everett Bogue, Independence, MO (US); Paul David Myers, Platte City, MO (US); Frank Hanshaw, III, Simsbury, CT (US); Robert Anthony Ruiz, New Britain, CT (US)

(73) Assignee: Recovery Management Corporation, Independence, MO (US)

( * ) Notice: Subject to any disclaimer, the term of this patent is extended or adjusted under 35 U.S.C. 154(b) by 0 days.

(21) Appl. No.: 09/143,277

(22) Filed: Aug. 28, 1998

Related U.S. Application Data

(63) Continuation-in-part of application No. 08/622,033, filed on Mar. 26, 1996.

(51) Int. Cl.$^7$ ............................................... G06F 17/60
(52) U.S. Cl. ........................... 705/28; 705/22; 705/23; 705/29
(58) Field of Search ........................ 705/22–23, 28, 705/29

(56) References Cited

U.S. PATENT DOCUMENTS

| | | | |
|---|---|---|---|
| 3,786,944 A | * 1/1974 | Daigle et al. ............... 214/16.4 |
| 3,996,568 A | 12/1976 | Sturm et al. ............... 340/172.5 |
| 4,074,120 A | 2/1978 | Allred et al. ............... 235/419 |
| 4,336,589 A | 6/1982 | Smith et al. ............... 364/403 |
| 4,340,810 A | 7/1982 | Glass ............... 235/375 |
| 4,509,123 A | 4/1985 | Vereen ............... 364/300 |
| 4,525,071 A | 6/1985 | Horowitz et al. ............... 366/152 |
| 4,558,318 A | 12/1985 | Katz et al. ............... 340/825.34 |
| 4,656,591 A | * 4/1987 | Goldberg ............... 364/478 |
| 4,816,824 A | 3/1989 | Katz et al. ............... 340/825.34 |
| 4,832,204 A | 5/1989 | Handy et al. ............... 209/3.3 |
| 4,887,208 A | 12/1989 | Schneider et al. ............... 364/403 |
| 5,038,283 A | 8/1991 | Caveney ............... 364/403 |
| 5,117,096 A | 5/1992 | Bauer et al. ............... 235/375 |
| 5,231,273 A | 7/1993 | Caswell et al. ............... 235/385 |
| 5,262,940 A | 11/1993 | Sussman ............... 364/403 |
| 5,289,372 A | 2/1994 | Guthrie et al. ............... 364/403 |
| 5,299,116 A | 3/1994 | Owens et al. ............... 364/403 |
| 5,319,544 A | 6/1994 | Schmerer et al. ............... 364/403 |
| 5,334,822 A | 8/1994 | Sanford ............... 235/385 |
| 5,335,170 A | 8/1994 | Petteruti et al. ............... 364/403 |
| 5,631,827 A | 5/1997 | Nicholls ............... 395/228 |
| 5,646,389 A | 7/1997 | Bravman et al. ............... 235/385 |
| 5,712,989 A | * 1/1998 | Jhonson et al. ............... 395/228 |
| 5,798,693 A | * 8/1998 | Engellenner |

FOREIGN PATENT DOCUMENTS

| | | | | |
|---|---|---|---|---|
| DE | 003630095 A1 | * | 3/1988 | ........... B65G/47/10 |
| JP | 401276085 A | * | 11/1989 | ........... G01S/13/74 |

OTHER PUBLICATIONS

"From catalog to retail distribution, inventory accuracy is enviable 99.7%", Automatic I.D. News, p 20, Nov. 1994.*
Steltzer (Demco Express (distribution)), Chilton's Distribution, v88, n9, p86, Sep. 1989.*

* cited by examiner

*Primary Examiner*—Vincent Millin
*Assistant Examiner*—Jagdish N Patel
(74) *Attorney, Agent, or Firm*—Lathrop & Gage, L.C.

(57) ABSTRACT

A method and apparatus for managing inventory in a distressed inventory warehouse with the aid of a programmable computer is disclosed. The method and apparatus provides for the complete automation of the inventory management of a distressed inventory warehouse. The method and apparatus also provides for the continual updating of records related to the distressed inventory as it passes through various stages within the distressed inventory warehouse.

18 Claims, 6 Drawing Sheets

METHOD FOR MANAGING INVENTORY

This is a continuation-in-part of application Ser. No. 08/622,033 filed Mar. 26, 1996.

SOURCE CODE APPENDIX

A Source Code appendix containing a source code of a computer program used with the present invention is appended hereto as Appendix A.

BACKGROUND OF THE INVENTION

1. Field of the Invention

The present invention relates to a method for managing inventory with the aid of a programmable computer, and more particularly to a method for receiving, sorting, marking, tracking, and selling distressed inventory which has been delivered to a distressed inventory central warehouse. The method provides for the complete automation of the inventory management of a distressed inventory warehouse and the continual updating of inventory data records related to the distressed inventory as it passes through various stages within the warehouse, including matching and identifying lost inventory.

2. Description of the Prior Art

Approximately 1% of all inventory shipped by freight carriers in the U.S. does not reach its intended destination or is not accepted by the buyer once it reaches its destination. This type of inventory is commonly referred to as "distressed inventory." Inventory often becomes distressed inventory because it was accidentally loaded on the wrong freight truck, damaged, or simply marked improperly.

Distressed inventory often cannot be feasibly reunited with the original inventory manufacturer or seller because freight carriers often do not immediately return to the place where they initially picked up the inventory. Therefore, it is common for freight carriers to deliver distressed inventory to centrally located distressed inventory warehouses that sort, store, redeliver or sell the inventory.

Once the distressed inventory is delivered to the distressed inventory warehouse, the distressed inventory warehouse must manage the distressed inventory and determine how to best deal with it. There are many unique problems associated with the managing of distressed inventory that are not encountered in the management of "regular" inventory. For example, regular inventory is typically delivered to a warehouse only after it has been ordered. Further, the ordered inventory will usually be clearly identified, typically in the form of documentation which accompanies the inventory (i.e., freight bills, labels, UPC code, etc). Yet further, the delivery dates and times for regular inventory is set well in advance of the delivery. In contrast, with distressed inventory, it is impossible to anticipate what inventory will be lost, damaged, etc., during shipping; therefore, it is also impossible to anticipate what types of goods will be delivered to the distressed inventory warehouse and when the distressed inventory will be delivered. Accordingly, distressed inventory warehouses must be constantly prepared to receive and manage all types of inventory, particularly unidentified inventory, at all times.

Another unique problem associated with the management of distressed inventory is that many different types of inventory may be received by a single distressed inventory warehouse without advance notice. For example, it is not uncommon for distressed inventory warehouses to receive food items, clothing, vehicle parts, electronics, personal hygiene products, appliances, musical instruments, cleaning supplies and other similar goods. As can be appreciated, each of these types of inventory require different handling procedures. Thus, it is much more difficult to develop procedures for handling distressed inventory than for non-distressed inventory.

Another unique problem associated with the management of distressed inventory is that the distressed inventory is not always handled in conventional manners. For example, distressed inventory is often in such bad shape that it must be trashed or sold for scrap value. Additionally, some freight carriers require that certain types of distressed inventory be returned to them. Thus, distressed inventory warehouses must identify the distressed inventory that requires special handling and separate it from other types of inventory. Since different types of inventory must pass through different inventory management stages, it is exceedingly difficult to accurately manage and track all the distressed inventory received by a distressed inventory warehouse with known inventory tracking methods.

Another problem associated with the management of distressed inventory is that it is difficult to obtain and maintain sufficient records for use in pricing the distressed inventory for sale.

Methods and apparatuses for managing and tracking inventory are known in the art. However, none of these prior art methods and apparatus have been designed to take into account the unique difficulties associated with managing distressed inventory. Accordingly, there is a need for a method and apparatus for tracking inventory that is particularly configured for managing distressed inventory.

OBJECTS AND SUMMARY OF THE INVENTION

In view of the problems associated with managing distressed inventory as set forth, it is an object of the present invention to provide a method and apparatus for managing and tracking inventory with the aid of a programmable computer that is particularly designed to take into account the unique difficulties associated with managing distressed inventory.

It is a more particular object of the present invention to provide a method and apparatus for managing and tracking distressed inventory with the aid of a programmable computer that allows an operator to easily and effectively identify and mark distressed inventory as it arrives at the distressed inventory warehouses.

It is another object of the present invention to provide a method and apparatus for managing and tracking distressed inventory with the aid of a programmable computer that allows an operator to easily and effectively track and sell inventory after it has been identified and marked and as it passes through various other stages in the distressed inventory warehouse.

It is another object of the present invention to provide a method and apparatus for managing and tracking inventory with the aid of a programmable computer that creates a unique inventory data record for each piece of inventory that is received by the distressed inventory warehouse and that permits the inventory data record to be instantaneously updated from anywhere in the distressed inventory warehouse to indicate the status of the inventory.

It is another object of the present invention to provide a method and apparatus for managing and tracking distressed inventory with the aid of a programmable computer that permits sales people to enter into negotiations with potential customers for the sale of the distressed inventory anywhere in the distressed inventory warehouse and that permits the appropriate inventory data records to be continually updated to indicate these negotiations.

It is another object of the present invention to provide a method of creating and managing a database of product UPC codes for use in pricing distressed inventory for sale.

In view of these and other objects that become evident from the following description of the present invention, a method and apparatus that is particularly designed for managing and tracking distressed inventory with the aid of a programmable computer is provided. The preferred inventory tracking apparatus broadly includes a centrally located host computer, a printer, and a plurality of remote programmable input devices located throughout the distressed inventory warehouse and in communication with the host computer.

The host computer is operable for receiving inventory information relating to the distressed inventory and for creating and storing inventory data records containing the inventory information. The label printer is coupled with the host computer and is operable for printing machine-readable inventory labels that relate to their respective inventory data records for placement on the inventory.

The programmable input devices are in communication with the host computer and may include portable scanning devices, remote access terminals or computers or other types of programmable devices. The programmable input devices are operable for inputting or scanning the machine-readable inventory labels and for communicating with the host computer for receiving and transmitting tracking, sales and other status information.

The method of the present invention is performed with the aid of a computer program for operating the host computer described above. The method broadly includes the steps: a) receiving into the host computer inventory information related to a piece of inventory, the inventory information including inventory identification information and inventory destination information; b) storing the inventory information in an inventory data record in the computer; c) printing a machine-readable inventory label with a printer coupled with the computer, the inventory label including an inventory code associated with the inventory data record; d) placing the inventory label on the inventory; e) entering the inventory code into a programmable input device in communication with the computer for accessing the inventory data record; f) entering updating information into the programmable input device whenever the inventory information changes; g) sending the updating information from the programmable input device to the computer; and h) updating the inventory data record stored in the host computer in response to receipt of the updating information.

The updating information specified above may include order information indicating that a customer has offered to buy the inventory, tracking information indicating that the inventory has been moved to a new location within the warehouse, and pricing information to change the price of the inventory. This updating information is transmitted from the programmable input device to the host computer to update the inventory data record for constantly maintaining accurate inventory information within the host computer.

The present invention also includes a method for creating and managing a database of product UPC codes for use in pricing distressed inventory for sale.

BRIEF DESCRIPTION OF THE DRAWING FIGURES

A preferred embodiment of the present invention is described in detail below with reference to the attached drawing figures, wherein.

DETAILED DESCRIPTION OF THE PREFERRED EMBODIMENTS

I. INVENTORY MANAGEMENT APPARATUS

Figure 1:
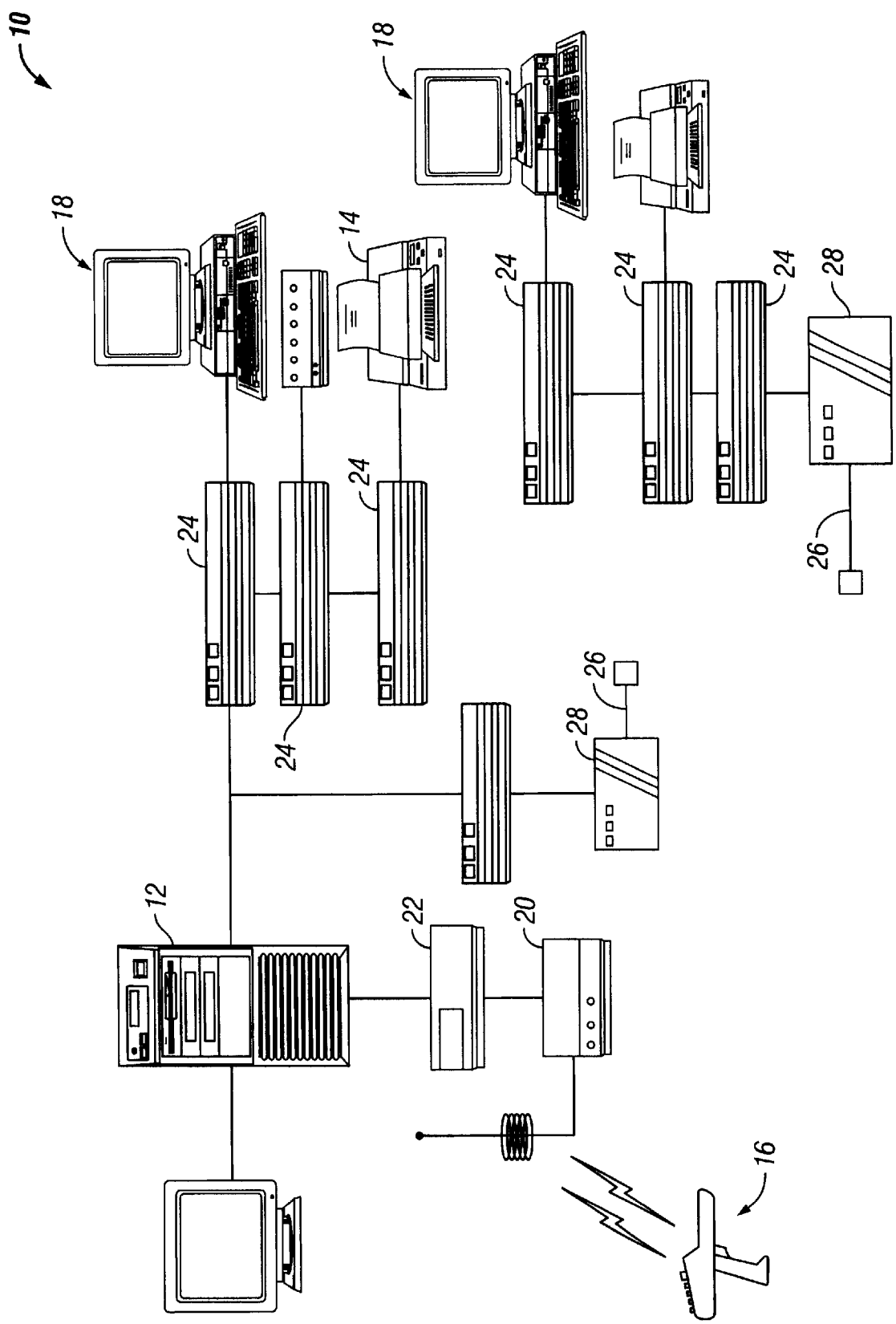
FIG. 1 is a schematic representation of the inventory management apparatus constructed in accordance with a preferred embodiment of the present invention.

Turning now to the attached drawing figures, FIG. 1 illustrates the preferred inventory management apparatus 10 of the present invention. The following description of the inventory management apparatus 10 is provided for disclosing a preferred embodiment and best mode of the present invention. Those skilled in the art will appreciate that the preferred components of the inventory management apparatus 10 may be replaced with equivalent components without departing from the scope of the present invention.

The preferred inventory apparatus 10 broadly includes a host computer 12, one or more printers 14 coupled with the host computer 12, and a plurality of programmable input devices in communication with the host computer 12. The programmable input devices may include one or more remote computers 18, or any other types of input devices.

In more detail, the host computer 12 is provided for receiving inventory information relating to the distressed inventory and for creating and maintaining inventory data records containing the inventory information. The host computer 12 may be any type of minicomputer, microcomputer or mainframe computer but is preferably a Hewlett Packard 9000 Series 800 Model E server computer that uses the HP-Unix operating software and includes a conventional display monitor, a digital data storage tape drive, dual two-giga byte mirroring hard drives, and an integrated local-area-network (LAN) connection. Those skilled in the art will appreciate that the host computer 12 may be any type of computer including a microcomputer, minicomputer, or mainframe computer.

The printer or printers 14 are coupled with the host computer 12 and may be any conventional printer operable for printing machine-readable inventory labels. In preferred forms, a plurality of printers 14 are provided at various locations throughout the distressed inventory warehouse.

The programmable input devices are operable for scanning or entering the machine-readable inventory labels and for communicating with the host computer 12 to provide updating information to the host computer 12. As discussed above, the programmable input devices may include the portable scanning devices 16 or the remote computers 18. In preferred forms, a plurality of programmable input devices are provided at various locations throughout the distressed inventory warehouse.

The portable scanning devices 16 are preferably laser radio frequency (RF) terminals manufactured by Symbol Technologies. Each of the RF scanning devices 16 preferably includes a programmable microprocessor, a barcode scanner, an alphanumeric keypad, a portable printer, and a radio transceiver.

The RF scanning devices 16 communicate with the host computer 12 by transmitting and receiving radio signals to and from an RF transceiver 20 coupled with the host computer 12. The preferred RF transceiver 20 is also manufactured by Symbol.

A serial access bridge 22 also preferably manufactured by Symbol Technologies serves as a bridge between the RF transceiver 20 and the host computer 12. The serial access bridge 22 manages radio frequencies used for transmission, determines the most optimum frequencies in the surrounding environment, and determines the "chipping" sequence used to encrypt all transmissions between the RF scanning devices 16 and the host computer 12. The serial access bridge 22 also manages the transmission handoffs between the RF scanning devices 16 and the RF transceiver 20 by assigning unique configuration numbers to each of the RF scanning devices 16 and the RF transceiver 20 so that transmissions from each unit can be recognized.

Each remote computer 18 is preferably a conventional IBM compatible or equivalent microcomputer having a 486 or Pentium type microprocessor and a display screen; however, they may also be "dumb" terminals with input capabilities only. In preferred forms, a plurality of remote computers 18 are positioned in various strategic locations within the distressed inventory warehouse.

A plurality of data communications and terminal controllers 24 are provided for coupling the host computer 12 with the remote computers 18 and printers 14. The datacommunications and terminal controller 24 transfers data between the remote computers 18 and the host computer 12 and controls communications that would otherwise be controlled by the host computer 12, thus freeing the host computer 12 from these management functions. The datacommunications and terminal controllers 24 are preferably 16-port devices manufactured by Hewlett Packard and are connected with the host computer 12 by conventional LAN cabling.

As illustrated, the host computer 12 may also be coupled with remote computers 18 that are positioned outside the distressed inventory warehouse by a digital leased line 26. The digital leased line 26 is preferably a 4-wire conductor provided by an all-digital transmission network.

A pair of data/channel service units 28 provide for communication between the host computer 12 and the remote computers 18 positioned outside the distressed inventory warehouse. Each data/channel service unit 28 functions as a digital modem, boosting signals across the digital leased line 26. Each data/channel service unit 28 is designed for direct connection to the digital leased line 26 and is operable for transmitting data at up to 56,000 bits-per-second (bps). The data/channel service units 28 are preferably manufactured by Motorola.

As will be recognized, any equipment with equipment or better capabilities, features, etc. can be used to practice this method.

II. INVENTORY MANAGEMENT METHOD

The method of the present invention manages distressed inventory or freight delivered to a distressed inventory warehouse. As used herein, inventory and freight are considered to be synonymous and are therefore used interchangeably. Additionally, as used herein, distressed inventory or freight is understood to include all types of inventory, particularly unidentified inventory, that is delivered to a distressed inventory warehouse by a freight carrier, including but not limited to, food items, automobile parts, clothing, personal hygiene products, art work, furniture, appliances, electronics, rugs, musical instruments, sports equipment, jewelry, and all other consumer wholesale and retail goods.

The inventory management method of the present invention is implemented with the aid of a computer program for operating the inventory management apparatus 10 described above. The computer program is preferably written in Pick Basic language, but may also be written in other conventional program languages. The computer program is preferably stored in the read-only memory (ROM) of the host computer 12, but may also be stored in the host computer's hard drive or in external disks or tapes for transfer to the memory of the host computer 12.

The source code for the computer program is reproduced in the appendix attached in the parent application. The flow diagrams in the drawing figures provide a high-level overview of the computer program.

Many of the method steps described and illustrated herein require an operator or distressed inventory warehouse salesperson to enter or scan in information concerning the inventory. These scanning or entering steps can be performed at any of the components of the inventory management apparatus 10 including the host computer 12, any of the RF scanners 16 or any of the remote computers 18. This allows the inventory to be managed from anywhere within the distressed inventory warehouse.

Figure 2:
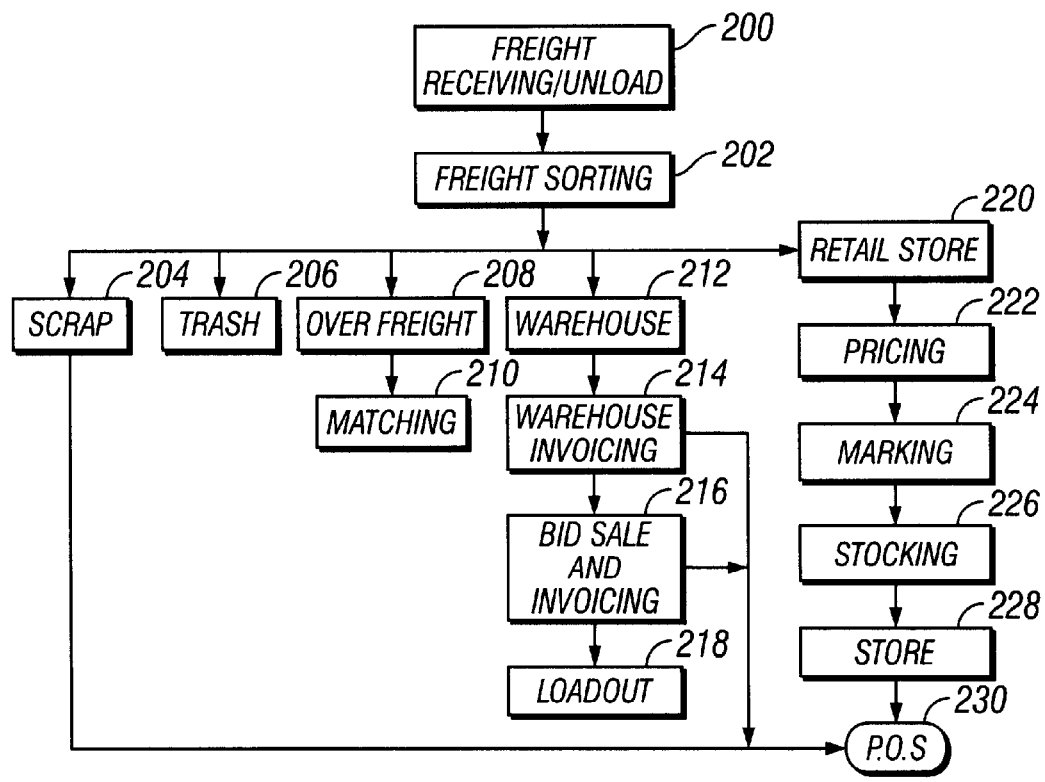
FIG. 2 is a flow diagram illustrating an overview of the steps in the preferred inventory management method of the present invention.

FIG. 2 illustrates an overview of the inventory management method of the present invention. As illustrated generally in step 200 of FIG. 2, inventory or freight is first received by the distressed inventory warehouse and unloaded. Then, at step 202, the freight is sorted into several categories that determine how the freight will be managed within the distressed inventory warehouse. In preferred forms, the freight is sorted into the following categories: (1) freight that will be sold for scrap value (step 204); (2) freight that will be trashed (step 206); (3) over freight that will be reunited with the freight carrier or manufacturer (steps 208 and 210); (4) freight that will be stored, managed, and sold in the warehouse of the distressed warehouse inventory (steps 212, 214, 216, and 218); and (5), freight that will be stored, managed, and sold in a retail portion of the distressed inventory warehouse (steps 220, 222, 224, 226, and 228). The management, tracking, and sales of the freight during each of these categories or stages is discussed in more detail below.

UNLOAD PROCESS

Figure 3:
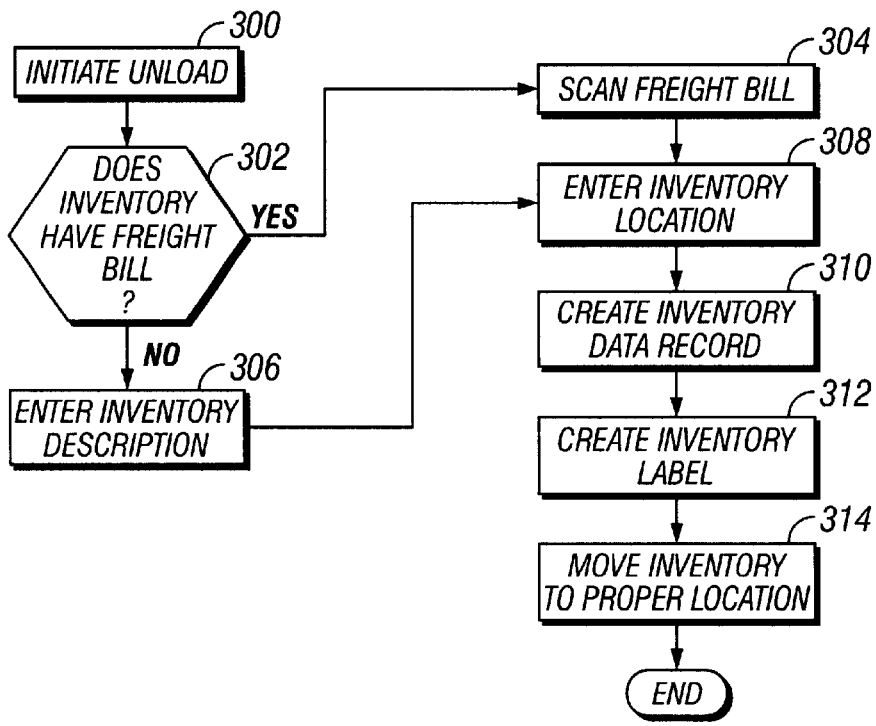
FIG. 3 is a flow diagram illustrating the inventory unloading and sorting portion or subroutine of the present invention.

FIG. 3 illustrates the freight unloading portion or subroutine of the present invention. In general, this portion or subroutine of the method provides for the unloading of the freight carrier, the identifying of the inventory delivered, and the creation and storage of inventory data records in the host computer 12 for use in managing and tracking the inventory as it passes through various stages within the distressed inventory warehouse.

In more detail, the inventory or freight is first delivered to the distressed inventory warehouse by a freight carrier. After the freight carrier has arrived, an operator logs the arrival time and unload start time of the freight carrier. Then, the operator initiates the unload subroutine or portion of inventory management method by accessing the appropriate subroutine in the host computer 12 as illustrated generally in step 300. Access may include conventional log-on or connection procedures and may provide an initial display screen informing the operator of the options available in the unload subroutine.

After the freight has been unloaded, it must be identified before proceeding through various stages in the distressed inventory warehouse. To identify the freight, the operator first determines whether the inventory has been delivered with a freight bill as illustrated in step 302.

If a freight bill has been provided with the inventory, the operator scans the bill or enters the freight bill information manually into the host computer 12 or one of the programmable input devices in communication with the host computer 12 in step 304. Alternatively, if a freight bill has not been provided with the inventory, the computer program prompts the operator to enter a description of the inventory including the inventory type, quantity, condition and other information to describe the inventory in step 306.

Next, in step 308, the computer program prompts the operator to enter the location within the distressed inventory warehouse where the inventory will be initially stored before it proceeds through further stages of the inventory management method. As described in more detail below, this location may include a warehouse area, a retail area, or other specialized areas for particular types of freight.

After receiving this inventory identification information and location information, the host computer 12 stores the information in an inventory data record as illustrated generally in step 310. The host computer 12 creates a unique inventory data record for each piece of inventory received in the distressed inventory warehouse. Inventory labels are then printed by a printer 14 coupled with the host computer 12 or any one of the remote computers 18 and applied to the pieces of inventory as indicated in step 312. Each inventory label preferably includes a machine-readable code that identifies or is associated with its respective inventory data record.

During the unload portion or subroutine of the inventory management method, the operators also sort the inventory into groups and place groups of inventory onto portable storage containers such as pallets. Then, the host computer 12 creates and stores a portable grouping unit (PGU) data record for each pallet. Each PGU data record identifies each and every piece of inventory on its respective pallet. The host computer 12 also creates a pallet identification number, or PGU number, for each pallet. Finally, PGU labels that identify their respective PGU data records are printed and applied to the pallets. Once the unload portion or subroutine of the inventory management method is complete, the operator logs the unload end time, and the pallets of inventory are moved to their proper locations within the distressed inventory warehouse. As used herein, overfreight and overgoods are considered to be synonymous and are therefore used interchangeably.

OVERGOODS MANAGEMENT

Figure 11:
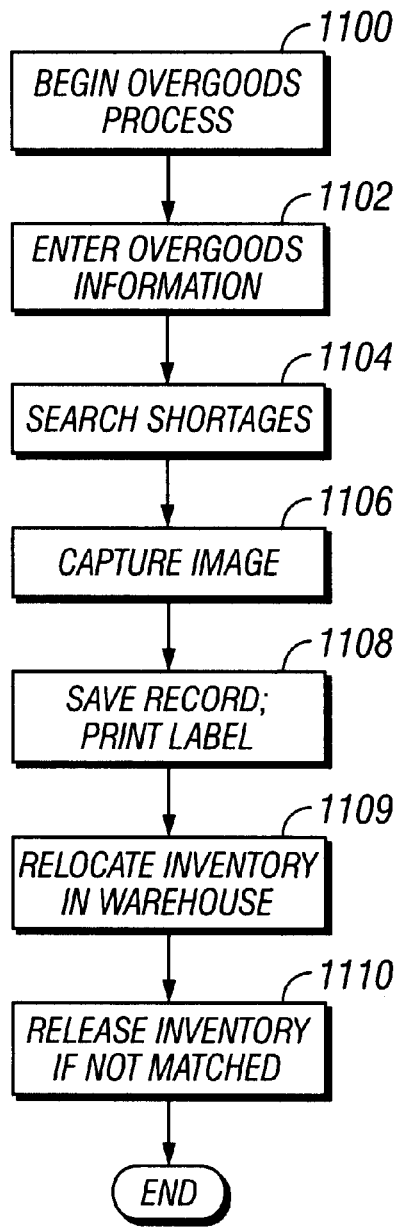
FIG. 11 is a flow diagram illustrating the overgoods management portion of the present invention.

FIG. 11 illustrates the overgoods management portion or subroutine of the inventory management method. In general, the overgoods management portion of the method manages the distressed inventory in those situations in which the inventory is identified as overfreight/overgoods, and cannot yet be released to the other stages of the inventory management method. While the preferred embodiment described below is directed to managing certain distressed inventory, it is to be recognized by one of skill in the art that management of any type of inventory is within the scope and spirit of the invention, even if the inventory is not categorized as distressed inventory.

As inventory is received by the distressed inventory warehouse and unloaded, as illustrated in FIGS. 2 and 3, the inventory is sorted and moved to the proper location, as illustrated in steps 200, 202, and 314. As will be recognized by one of skill in the art, the term "warehouse" includes any storage facility. If the inventory meets predetermined criteria, which may be defined by each individual carrier, then the inventory is designated as overgoods inventory and moved to an area designated for receipt of overgoods inventory, and the overgoods process begins, step 1100. The predetermined criteria may be a code assigned to the shipment before its receipt, a dollar value for any particular shipment of inventory, a special account designation based upon the manufacturer of the item, or any other desired criteria. If the inventory does not meet this predetermined criteria, then it is not designated as overgoods inventory and is categorized appropriately, as illustrated on FIG. 2 as discussed above.

When the overgoods inventory arrives in the area designated for overgoods, it may already have attached thereto the inventory label created in step 312. After the overgoods inventory arrives, an operator examines the shipment and enters overgoods information for each piece of overgoods inventory into a separate overgoods record in the computer, as illustrated in step 1102. The overgoods information includes descriptive product information, location information, and carrier information. The location information includes a corresponding PGU number associated with each piece of inventory. It is to be noted that a "piece" of inventory may be a single container or several related containers, such as an entire pallet of containers. The corresponding overgoods record may contain information for each individual container, or for each group of related containers.

As will be recognized by one with skill in the art, the descriptive product information may be made up of any information associated with the overgoods inventory. The descriptive product information in a preferred embodiment of the present invention includes designation of the inventory into one of five different classifications, each of which has different descriptive product information associated therewith. These classifications, with examples of detailed descriptive product information, are:

Clothing—RN number, style, manufacturer, color, size, UPC;

Long Iron—Ferrous, color code, type, manufacturer, weight, dimension, alloy code, UPC;

Tires—tire size, type (white wall, etc.), manufacturer, UPC;

Fabric—manufacturer, pattern, weave, material, size, weight, color, UPC;

General—UPC manufacturer, style, model, serial number, size, color, weight.

The information entered includes a cross-reference, generally by way of an identification number, with the inventory data record created in step 310, illustrated in FIG. 3. This provides a cross-reference between the record generated during the unload process and the record generated in the overgoods process.

Once the descriptive product information has been entered, the operator may then perform a search of a shortage file or any outstanding inquiry file to attempt to match the inventory before it is moved to the overgoods storage area, as illustrated in step 1104. The shortage file includes information provided by the carriers regarding inventory that the carriers know is unaccounted for. This shortage information is not provided by all carriers, and may not be searched for every overgoods record entered into the computer. An outstanding inquiry file may include inquires related to certain distressed shipments recorded by carrier representatives. If there is a match when searching the shortage or inquiry file, then the inventory is removed from the overgoods area and is generally returned to the carrier, although it may also be reclassified in accordance with step 202, discussed above, but may be disposed of in other manners. An overgoods record is still generally created for this inventory.

If a match is not found corresponding to the shortage file, the operator may then generate a digital image of the overgoods inventory to be stored with the overgoods record corresponding to the overgoods inventory, as illustrated in step 1106. While this step is not performed for all overgoods inventory, it is often advantageous to store an associated image for inventory that is particularly difficult to describe. In a preferred embodiment, the operator focuses a digital camera on the overgoods inventory and captures the image from the digital camera to associate with the overgoods record. It is to be noted that one of skill in the art will recognize other manners in which to capture a digitized image to associate with the record other than the one described, all of which are within the spirit and scope of the present invention.

When the desired descriptive information has been entered into the overgoods record, the operator then enters location information into the record. The location information identifies the portable grouping unit (PGU) with which the inventory is located. The specific location of each PGU, and a specific location of the inventory, is then updated in each associated overgoods record when the PGU is moved to its proper location within the distressed inventory warehouse. This location can be input into the overgoods record by any RF scanning unit 16 or remote computer 18 to update the location information of the PGU, and its corresponding inventory, whenever the PGU is placed or relocated within the distressed inventory warehouse. The location maintained in the corresponding overgoods record is the current location of the inventory.

The information entered into the overgoods record regarding the overgoods inventory may include designation of special status, as discussed in greater detail in the warehouse invoice and loadout process section below. Such special status will prohibit the item from ever being sold, and may require other special actions. Examples of the type of inventory that may be designated with special status information are prescription drugs, narcotics, alcohol and tobacco, high value items, firearms, and ammunition. Further, certain manufacturers and distributors require carriers to return distressed inventory, without release to a distressed inventory central warehouse.

After the overgoods record has been entered into the computer by an operator, the record is saved in the computer and the computer generates an overgoods record number, preferably a sequential number. Preferably, this number contains a code that relates the overgoods inventory to its associated carrier. A label is then printed by a printer 14 coupled with the computer 12 or any one of the remote computers 18, as illustrated in step 1108. The label is applied to the inventory and is indicated in step 1108. Generally, the label contains a bar code identifying the proper corresponding record, and may contain information, such as the overgoods record number and product description, that may be read by an operator. After the label is placed upon the inventory, the inventory is placed in or on the PGU. Once a PGU has reached the capacity of inventory it may contain, it is moved to a location within the distressed inventory warehouse, and the corresponding location information is updated.

The overgoods records in the computer may be searched for records matching preselected criteria, which may generate at least one matched overgoods record corresponding to matched overgoods inventory. The preselected criteria preferably includes information about the carrier associated with the overgoods inventory. This search process may be performed by an operator from the host computer 12, remote computers 18, or by personnel associated with the carriers who have a computer system connected to the host computer 12, such as by a wide area network. An operator must log into the system and provide a login code, such as a user name and password, before access will be granted, as illustrated in step 1202. Access by an operator may be, and preferably is, restricted to certain overgoods records. For example, personnel from carrier A will be allowed access only to overgoods records associated with overgoods inventory received from carrier A, and not allowed access to overgoods records corresponding to overgoods inventory received from any other carrier. The specific login code will also indicate whether the operator may properly designate a record as a "match," as discussed in more detail below. Some personnel will be able to access the system and perform a search for several or all carriers simultaneously.

Once the operator has provided an appropriate login code and selects the appropriate subroutine to search the overgoods system, the computer will prompt the operator for search criteria which includes a text field where the operator may enter a string of alphanumeric characters to search. While it is to be recognized by one of skill in the art that the search criteria may be customized to fit the particular needs of the specific application, in a preferred embodiment the search criteria include: carrier; commodity code; quantity range (e.g. all items with the quantity being between five and ten); weight range (e.g. all items with weights between fifty pounds and seventy-five pounds); overgoods record date range (to search a date range during which the overgoods record was created); and shipping date range (to search date ranges during which the inventory may have been shipped). It is not necessary to enter values for each of the search criteria, but the search criteria are provided to limit the search results to more accurately locate records that may match the desired preselected criteria. The text field is provided to enter a string of alphanumeric characters to match characters that may appear in any field in the overgoods record. The alphanumeric string will also be checked against a file on the computer system containing synonyms of words, to improve the quality of the search. For example, if the alphanumeric string entered is "mitten," the system would also search for "mitt" and "glove." The text field will also accept wild card characters to search within a word or a part of a word. For example, the computer system would match an overgoods record containing the word "mitten" if the preselected criteria included "mit" with an appropriate wild card, such as *, for multiple letters. Single letter wild cards may also be provided. Further, a wild card character may be placed at the beginning of a word to find words having common endings. For example, if the alphanumeric string entered is "*mit," then the results would include records having the words, for example, "submit" or "summit."

Once the operator has entered the search criteria and any alphanumeric text in the text field, the operator may then command the computer to search the overgoods records for records matching the preselected criteria and may generate at least one matched overgoods record. If no criteria are matched, then there will be no matched overgoods record generated. At that point, the operator may select to enter alternate criteria and alphanumeric text or to stop the search. Generally, the preselected criteria will include information about the carrier for the particular overgoods inventory. As a practical matter, this is primarily done through screening via the login code to allow access only to particular records corresponding to a particular carrier. Alternatively, carrier information may be entered into the search criteria.

Once the matched overgoods record is generated, a "results" screen is displayed to the operator to provide them with feedback regarding the search. A variety of information may be provided to the operator regarding the results of the search. For example, information may be provided regarding any synonyms that were matched, the total number of matches for all criteria, the number of matches for each search criteria or specific alphanumeric string presented, etc. The operator may then elect to view a summary of the search results which displays selected fields of the matched records to indicate what overgoods inventory was "matched," as illustrated in step 1206. The operator may further select to view all of the information corresponding to the matched overgoods record. Also, if an image has been entered for the particular overgoods record in step 1106, the user may elect to view that image in conjunction with the overgoods record.

If the operator is satisfied that the matched overgoods record is, in fact, a "match," the operator will designate the record as a match and input information into the "match" field associated with the matched overgoods record, as illustrated in step 1208. This action will also stamp the current record with the current login code and the date the match was found. The operator will also enter the appropriate shipping information for the necessary disposition of the item. If the operator does not have the proper authority to designate a record as a "match," then the record is designated "on hold," which also stamps the date and login code into the record. Periodically, preferably daily, a report is generated for all records designated "on hold," and those items are reviewed by one with proper authority to designate the record as a "match." It is to be noted that the entire quantity of the inventory associated with a matched record may not always be matched by the search criteria. For example, if the overgoods record indicates that the specific overgoods inventory is ten cartons of goods, and the search criteria only specifies five cartons of the goods, then a "match" may be indicated for only five of the cartons associated with the matched record.

If the matched overgoods record is designated as a "match" by carrier personnel conducting the search, then the carrier personnel knows of the matched overgoods record. If the matched overgoods record has been matched by other than carrier personnel, the carrier is notified of the matched overgoods record that matches the preselected criteria.

Once the "match" is designated by one with proper authority and the shipping information has been entered, the overgoods record is removed from the searchable database. If only a partial quantity from the record is "matched," then the record remains open in the searchable database for the remaining quantity.

After the item has been designated as a "match," and the associated shipping information has been entered, then a printer 14 associated with the computer system prints information regarding the matched overgoods record, as illustrated in step 1210. This information includes the current location of the inventory, which includes the current location of the associated PGU. Then the overgoods inventory is physically located in the overgoods storage area of the distressed inventory warehouse and relocated from its current location for further processing to appropriately dispose of the matched overgoods inventory, as illustrated in step 1212. Generally, the matched overgoods inventory is returned to the shipper with which it is associated or is forwarded to a consignee, but it is to be recognized by one of skill in the art that the matched overgoods inventory may be otherwise handled.

If the overgoods inventory associated with the matched overgoods record cannot be located in the overgoods storage area in the distressed inventory warehouse, an appropriate entry is made in the matched overgoods record such that if the record is ever accessed again, a message appears to the operator that this item was previously matched and not found. For example, if an item accidentally falls from one PGU into another PGU, then this inventory may not be found if it has been matched, because the search in the proper PGU would not locate an item. However, in the future, the item may be located in the incorrect PGU, and the record accessed to determine the status of the item. At that point, the message would appear to the operator that this inventory has been previously matched but was unable to be located. Supervisory personnel would then be notified to address the situation.

There will be some overgoods records that do not match any of the criteria entered during the search process. Some of these records will not match any of the criteria entered for many search processes. Part of the overgoods information initially received into the overgoods record in the computer preferably includes a length of time that the inventory is to remain in the overgoods area of the distressed inventory warehouse, or a date on which the overgoods inventory may be released from the overgoods area of the distressed inventory warehouse. As a practical matter, these lengths of time are generally provided by the carrier. For example, carrier A may designate that all of the items designated as overgoods inventory received from that carrier must stay as overgoods inventory for at least five months, in order to be available to be matched and returned to the carrier. However, some inventory is not matched during that time period. Periodically, preferably each day, a report is printed that lists all overgoods inventory that has been designated as overgoods inventory for the preselected amount of time, or which has been designated for release on that particular day or earlier, but has not been released. These records are described as stale records. These stale records are included in a printout, along with corresponding location information for the overgoods inventory associated with the overgoods records that have not been matched and are due for release.

The associated overgoods inventory is referred to as a matured item. The matured items are then physically relocated from their current location in the overgoods area of the distressed inventory warehouse for release to a salvage process. The salvage process is redesignation of the overgoods inventory for either scrap, step 204, trash, step 206, warehouse, step 212, or retail store, step 220, as illustrated on FIG. 2. Then the distressed inventory will be managed as set forth in more detail herein.

In some cases, a carrier will have information regarding the shipper of the inventory, but not have sufficient information to deliver the inventory to the consignee or recipient. Generally, the carrier will then attempt to contact the shipper and determine the consignee of the shipment in question to enable appropriate delivery. However, if this fails, then the inventory that cannot be delivered may be called known overgoods, and is generally returned to the shipper, because the shipper information is known. The inventory management system of the present invention provides, either as a separate module or a subroutine of the present computer program, a known overgoods database for entry of information regarding these known overgoods.

When an item is determined by the carrier to be a known overgood, information regarding the known overgood is entered into the known overgood database in a computer, as in steps 306 and 1102. This information includes descriptive product information and shipper information. The descriptive product information may be the same as or different than that described above, depending upon the particular circumstances. It is to be recognized by one of skill in the art that the specific descriptive product information and shipper information may vary from application to application without departing from the spirit or scope of the invention.

Figure 12:
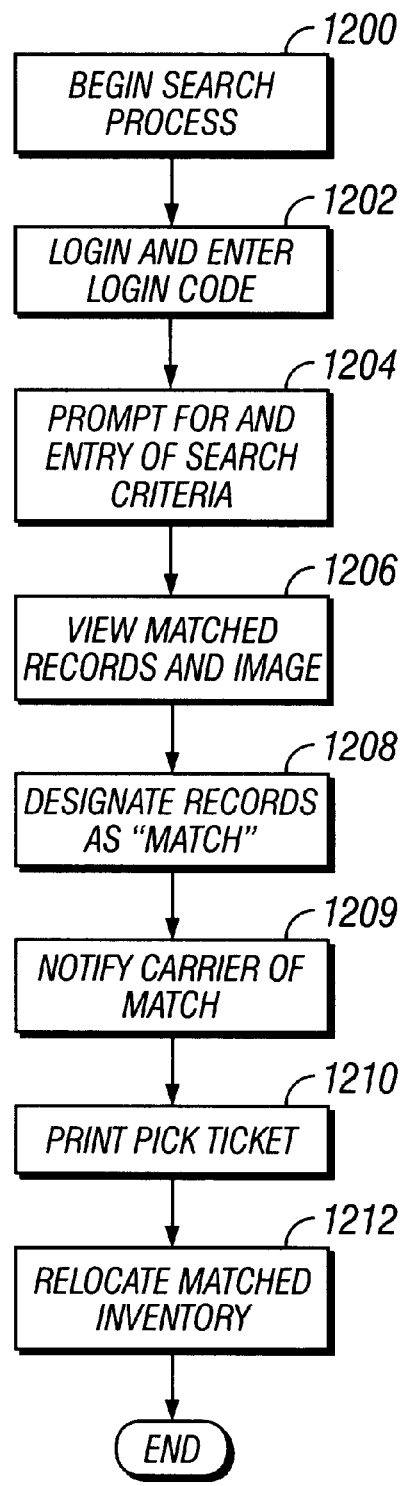
FIG. 12 is a flow diagram illustrating the search and match process of the overgoods management portion of the present invention.

After the information has been input into the known overgoods database, the distressed inventory is generally returned to the shipper for appropriate disposition. The known overgoods database is available to be searched for records matching preselected criteria to help identify and locate where particular inventory may be, as in FIG. 12. Often this preselected criteria is provided by the shipper or other requesting party to the carrier corresponding to requests regarding inventory that did not arrive at the intended destination. The search criteria and alphanumeric field of information may be similar to that which has already been described above.

If there are records in the known overgoods database that match the preselected criteria, then the shipper or other requesting party is provided the descriptive product information, which preferably includes the date the inventory was returned to the shipper for the inventory records that match the preselected criteria. The shipper may then physically identify the distressed inventory corresponding to the matched records by a review of the location of the inventory received from the carrier corresponding to the information provided from the matched record. Then the shipper may reship the identical inventory corresponding to the matched records or may select new inventory to be shipped to the consignee.

Often, a shipper, consignee, or other party will assert claims against a carrier for lost inventory. By use of the matching function of the known overgoods database, a carrier may provide information to the shipper or other party regarding inventory for which claims have been made that the carrier has actually returned to the shipper, forwarded to the consignee, or otherwise appropriately distributed. Thus, this matching function of the known overgoods database may prevent unnecessary and groundless claims against the carrier by shippers or other parties regarding inventory that has actually been returned to the shipper, forwarded to the consignee, or otherwise appropriately distributed.

RETAIL ORDER AND LOADOUT

Figure 4:
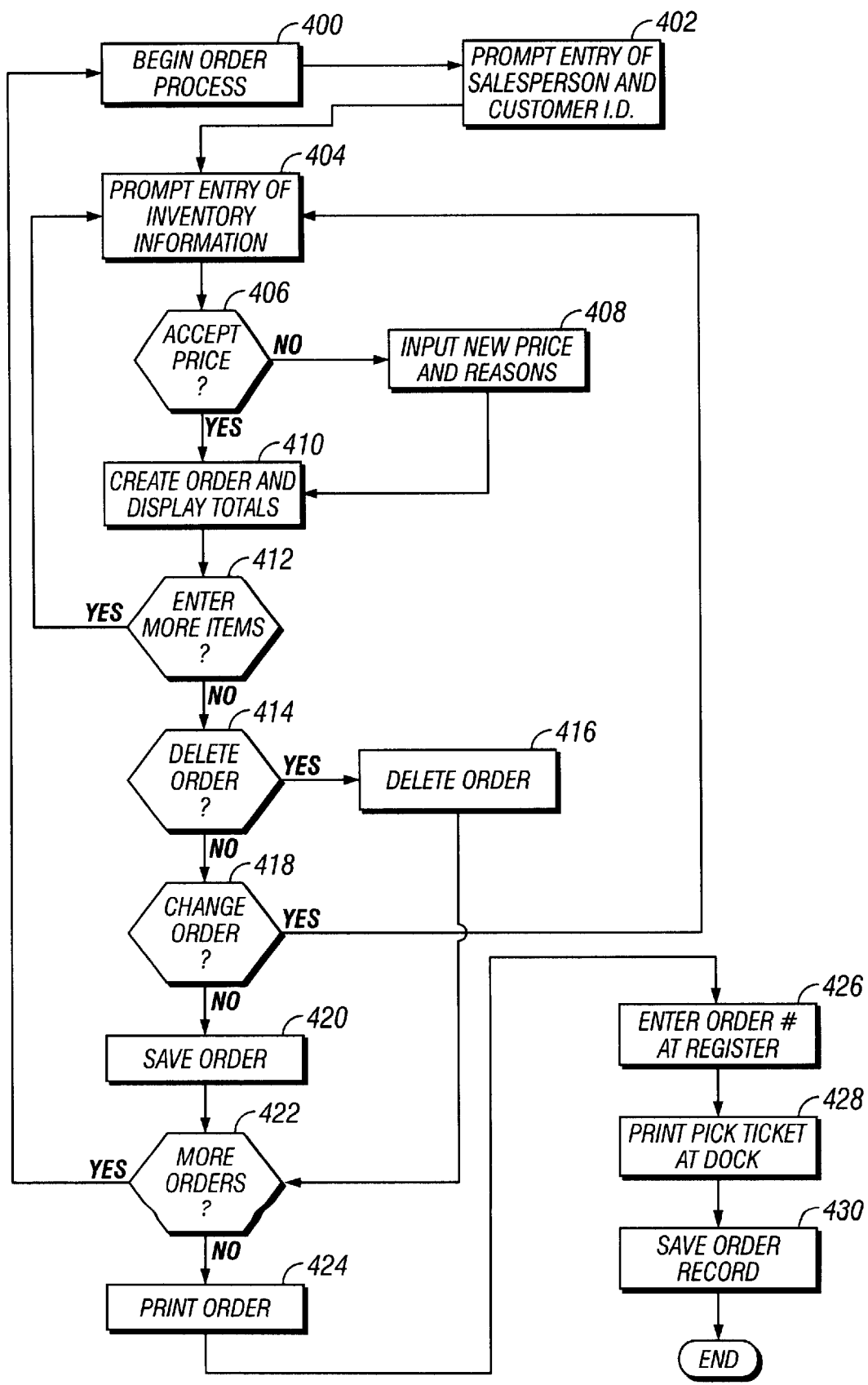
FIG. 4 is a flow diagram illustrating the retail order and load-out portion or subroutine of the present invention.

FIG. 4 illustrates the retail order and loadout portion or subroutine of the inventory management method. In general, the retail order portion of the method manages distressed inventory in those situations involving a purchase by a customer of an item of distressed inventory which cannot be taken through cashier lanes, or a purchase of distressed inventory at a reduced price.

In more detail, the retail order portion of the inventory management method is initiated in step 400 by an operator or salesperson after a customer has requested service. The computer program first prompts the operator to enter his or her salesperson I.D. number and the customer I.D. number in step 402. The computer program may also prompt entry of the customer's name, phone number, and other identifying information.

Next, in step 404, the computer program prompts for entry of inventory information identifying the inventory that the customer wishes to purchase. In preferred forms, the operator performs this step by scanning the inventory label placed on the inventory with one of the portable RF scanning devices 16 to access the inventory data records stored in the host computer 12.

After the inventory information is scanned or entered, the RF scanner 16 or remote computer 18 used for scanning or entering displays the assigned price for the inventory in step 406 and asks whether the price is acceptable to the customer. The inventory management method gives the salesperson the ability to either accept the assigned price for the distressed inventory or to perform a markdown of the price.

In the event of a markdown, the computer program prompts the sales person to enter the new price and a markdown code used to identify the reason for the markdown in step 408. This subroutine of the inventory management method also provides for the creation and storage of a data record containing a permissible markdown range for each salesperson. After the new price is entered, the host computer 12 compares the new price to the permissible markdown range for the corresponding sales person and verifies whether the markdown amount is within the permissible range. If the price is confirmed, the host computer 12 updates the appropriate inventory data record with this markdown information. The method also allows the operator to call up a pricing history for the inventory that lists the prices at which similar or identical pieces of inventory were sold to aid in the markdown pricing decision.

After the price of an item has been established and confirmed, the inventory management apparatus 10 creates a retail order for the sale of the inventory in step 410. The retail order may be generated by any of the RF units, remote computers 18, or host computer 12 and includes the name and password of the salesperson, the customer identification information, the inventory data record code or number, and the quantity of the inventory purchased.

As illustrated generally in steps 412, 414, 416, 418, 420, and 422, the retail order and loadout portion or subroutine also allows a salesperson to delete an order, change an order, and add more orders. The subroutine also allows a salesperson to view a running dollar total of items being purchased by a particular customer as the retail order is being processed and save and print the retail order and to go to another retail order for another customer. The salesperson can then later return to the prior customer's retail order.

The retail order and loadout portion of the method also allows a salesperson to view, at any time, on all RF units and all remote computers 18 or terminals, all items entered on any of the retail orders by entering the retail order's unique assigned number into any one of the RF units or remote computers 18.

After a retail order has been completed, it is saved in the host computer 12 as a retail order data record and is printed either on a dedicated printer coupled with the host computer 12 or on one of the portable printers 14 coupled with the RF scanning devices 16 or remote computers 18 as illustrated in step 424. The customer is then given a copy of the retail order to take to any cash register for payment.

To begin a retail checkout at a cash register, the cashier first presses a retail order button on the register and enters the retail order number in step 426. The portion of the method allows the cashier to adjust the tax status of each individual item if the buyer is tax-exempt. The method also allows the cashier to delete any items from the retail order and add any additional items that the customer has brought to the register not included on the retail order. The method then directs a printer 14 to print each item listed on the order on a point of sale (POS) receipt.

After the customer has paid for the inventory, a "pick" ticket is automatically printed at the distressed inventory warehouse loadout dock as illustrated in step 428. The pick ticket is used by the loadout person to locate the inventory and to transfer it to the dock door for loadout. The pick ticket may include, among other things, the retail order number, customer name, non-carryout items sold, quantity and location.

The method also generates a listing of non-carryout, purchased items on the loadout person's terminal for identifying items for customer pick-up. The listing of non-carryout, purchased items appears on a remote computer 18 positioned at the loadout dock when the loadout person enters an order number appearing on the retail order. The method permits the loadout person to scan out the purchased items as they are transferred to the customer. The method causes an error message to appear on the loadout terminal in the event that a scanned item does not appear on the list of purchased items.

Finally, the retail order and loadout portion of the method prints a loadout confirmation after all non-carryout items have been scanned and transferred by the loadout person to the customer. The loadout person then has the customer sign the loadout confirmation to acknowledge receipt of the items. The host computer 12 stores the retail order information in step 430 and retains it for future pickups in cases where a customer cannot pick up all the items on the retail order.

WAREHOUSE INVOICE AND LOADOUT PROCESS

Figure 5:
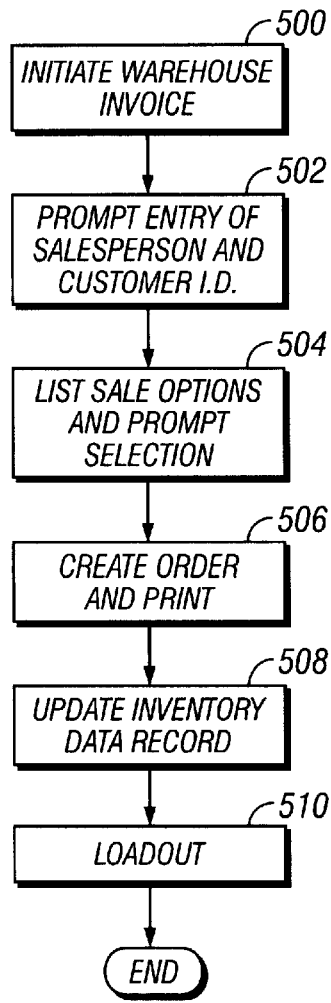
FIG. 5 is a flow diagram illustrating the warehouse invoice and loadout process portion or subroutine of the present invention.

FIG. 5 illustrates the warehouse and loadout portion or subroutine of the inventory management method of the present invention. In general, this portion of the inventory management method provides for the invoicing, sales, and loadout of inventory stored in the warehouse portion of the distressed inventory warehouse.

In more detail, a salesperson initiates the warehouse invoice and loadout process by accessing the appropriate subroutine in the host computer 12 in step 500. The computer program then prompts the salesperson to enter his or her I.D. number and customer identification as illustrated in step 502. The program then determines if the customer has a current invoice on file. If a current invoice is found, it is displayed.

Step 504 lists the sale options for the inventory and prompts for a selection. In preferred forms, the method permits a salesperson to scan or enter a portable grouping unit (PGU) number, then either price the whole PGU, or scan in individual items on the PGU with individual prices and descriptions. The input of the PGU number can be performed by any of the RF scanning units 16 or remote computers 18.

The inventory management method provides for the following sales options:

(1) selling one PGU that only has a single item;
(2) selling one PGU that has many items;
(3) selling one item that has multiple PGU's;
(4) selling one PGU of one item with multiple PGU's;
(5) selling less than the whole amount of one item on a PGU;
(6) selling multiple items on multiple PGU's;
(7) selling one item of many items on a PGU; or
(8) selling all items except one on a PGU;

The subroutine also allows salespeople to delete or change the quantity, price, or description of any previously entered item or PGU.

After a sale has been made, the inventory management method creates a warehouse order and prints the order at any one of the printers 14 in step 506. The customer can then take this warehouse invoice to any cash register for purchase and loadout as described above. Step 508 then updates the appropriate inventory data records in the host computer 12. During loadout, the inventory management method requires the loadout person to sign for the sold items with a unique account number to ensure that the proper items were loaded out.

After a warehouse order or invoice has been created and saved, the warehouse portion or subroutine of the inventory management method allows a salesperson to call back the invoice to either add to it, make changes in it, or delete it. The method also allows the cashier to adjust a tax status of each individual item and allows the cashier to delete any items from the warehouse invoice and to add any additional items the customer has brought to the register not included on the warehouse invoice. Finally, once the inventory has been sold, paid for, and loaded out, the inventory management method indicates in the appropriate inventory data records that the purchased items are no longer in the distressed inventory warehouse.

To account for items which have been purchased but not picked-up, the inventory management method generates a report of purchased items that have not been picked up, identifying the items by customer name and phone number. This permits the distressed inventory warehouse to contact the customer. In the event that a customer purchases a whole PGU of multiple items and not all of the items are found at loadout, the inventory management method does not modify the inventory data records for the unfound items.

Figure 6:
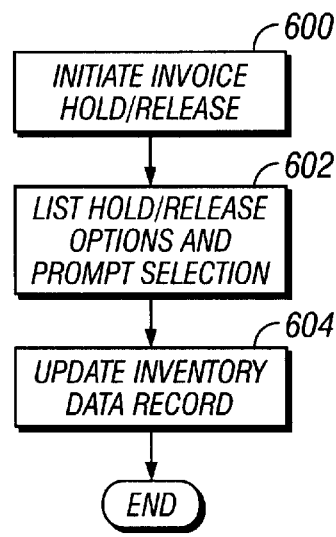
FIG. 6 is a flow diagram further illustrating the warehouse invoice and loadout process portion or subroutine of the present invention, and specially illustrating the hold and release portions of the warehouse subroutine.
Figure 7:
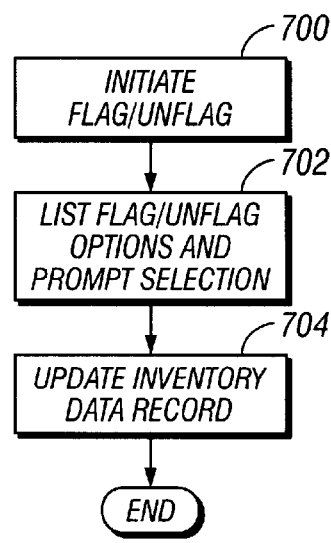
FIG. 7 is a flow diagram further illustrating the warehouse invoice and loadout process portion or subroutine of the present invention, and specially illustrating the flag and unflag portions of the warehouse subroutine.

FIGS. 6 and 7 are continuations of the warehouse invoice and loadout portion or subroutine of the inventory management method and illustrate the hold/release and flag/unflag options of method. These portions or subroutines permit any item or PGU entered on an invoice to be placed in a hold, release, flagged, or unflagged status.

For example, these subroutines permit a salesperson to input into the inventory management apparatus 10 a special status on any unsold item or PGU. The special status regarding a particular item is transmitted to the host computer 12 by way of any one of the RF scanning units 16 or remote computers 18 and is added to the appropriate inventory data records. The inventory data records can then be accessed by any RF scanning unit 16 or remote computer 18 to obtain this special status information. The special status information is intended to alert any other salesperson of special information about that particular item, e.g., that a bid has already been placed on that item, that the item appears on a faxed bid offering, or that a buyer has made an appointment to see the item.

As illustrated generally in steps 600, 602, and 604 of FIG. 6 and steps 700, 702, and 704 of FIG. 7, the inventory management method prompts a salesperson wishing to add a special status to enter his or her identification, comments regarding the special status, and the date the special status was created. Once a special status has been entered for a particular piece of inventory, the inventory management method prohibits the sale of that piece of inventory. The inventory management method allows for the release of the special status to release the item for sale after a special release code has been entered into any of the portable RF units or remote computers 18.

BID SALE LOADOUT-PROCESS

Figure 8:
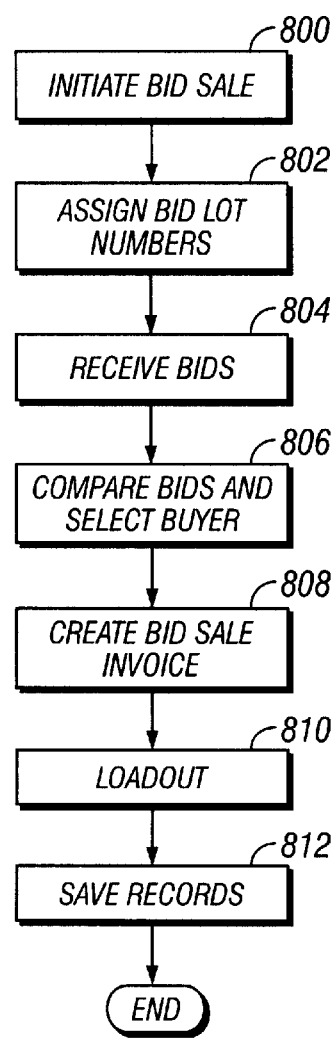
FIG. 8 is a flow diagram illustrating the bid sale and loadout portion or subroutine of the present invention.

FIG. 8 illustrates the bid sale and loadout portion or subroutine of the inventory management method. In general, this subroutine provides for the selling of inventory in the warehouse by a bidding or auction corresponds with the product category, and a reference price for which other stores such as Wal-Mart are selling the item.

After entering the above-described information, the operator is prompted to enter a selling price for the item in step 914. This selling price is saved with the child inventory data record for use in pricing other identical or similar types of inventory.

The inventory management method also provides for the creation and updating of a UPC code data base as illustrated generally in step 912. Each time an item's UPC code is scanned, the UPC information is saved in the UPC data base. The UPC data base also includes all of the information saved in the child data records described above. Thus, once a new UPC code is stored in the UPC data base, a permanent history of that product including detailed sales and markdown information is maintained. Then, each successive time that a UPC code is scanned for a product that has previously been scanned, the complete pricing history for that item can be retrieved and used for determining prices for the item.

PRICING MARKDOWN/MARKUP PROCESS

Figure 10:
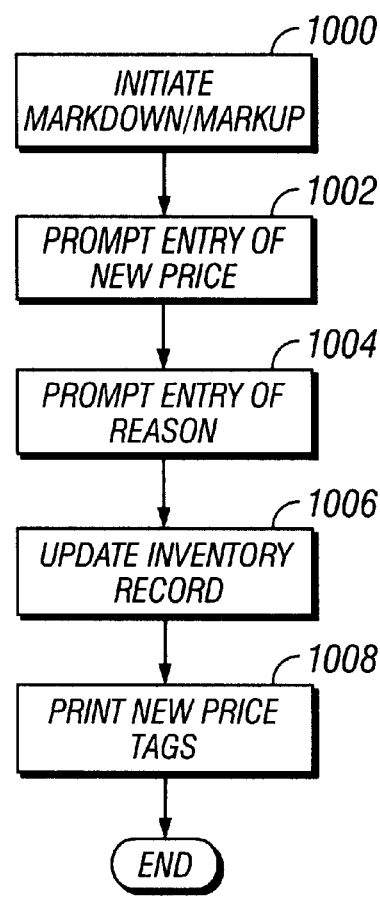
FIG. 10 is a flow diagram illustrating the price markdown and markup portion or subroutine of the present invention.

FIG. 10 illustrates the markdown/markup portion or subroutine of the inventory management method. In general, this subroutine provides for the marking down or marking up of the price or prices of an entire stock of a particular type of inventory that has been previously priced in the above-described pricing subroutine. This subroutine also allows for the marking down or marking up of the price or prices of selected portions of the stock of a particular type of inventory.

In more detail, the markdown/markup process is initiated when an operator accesses the appropriate subroutine of the inventory management method in step process, with the inventory typically being sold to the highest bidder.

In more detail, the bid sale and loadout process is begun when a salesperson accesses the appropriate subroutine in the inventory management method in step 800. To prepare the inventory for bid sale, it is first marked with bid lot numbers in step 802. Customers then submit bids for the inventory, and the bids are entered into any one of the RF scanning devices 16 or remote computers 18 in step 804.

Once all bids are received, the host computer 12 compares the bids and determines the highest bid price in step 806. The sales people then select the successful bidder, which is usually the high bidder. The inventory management method then creates, saves and prints a bid sale invoice in step 808. A copy of the bid sale invoice is given to the successful bidder in step 810 for loadout as described above. Finally, the appropriate inventory data records are updated and saved in step 812.

RETAIL PRICING AND MARKING

Figure 9:
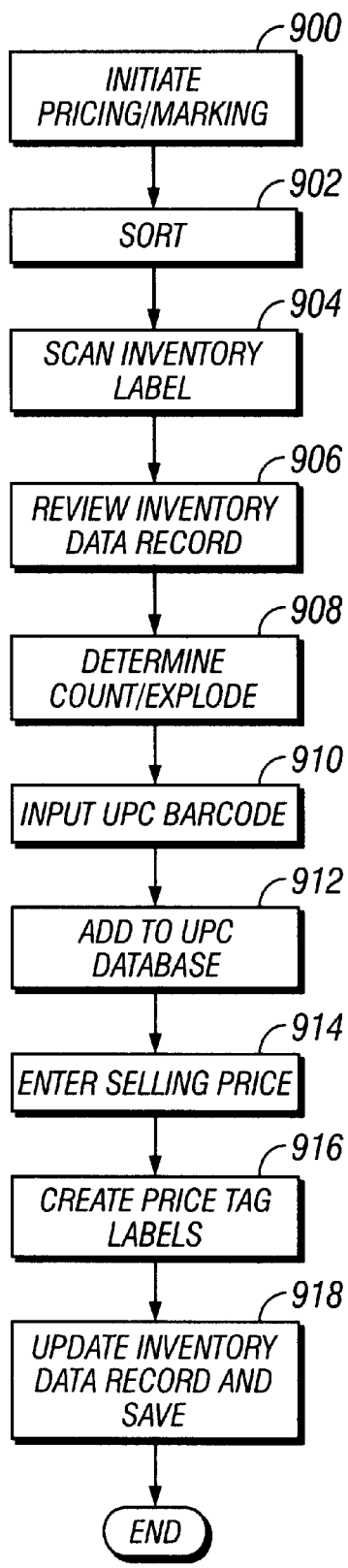
FIG. 9 is a flow diagram illustrating the pricing and marking portions and subroutines of the present invention.

FIG. 9 illustrates the retail pricing and marking portion or subroutine of the inventory management method. In general, this subroutine provides for the separating or "exploding" of inventory into saleable units, pricing of inventory based on criteria determined from previous pricing steps, and marking of the inventory with new price labels or tags.

In more detail, this portion of the inventory management method is initiated when a sales person access the appropriate subroutine in the host computer 12 by way of a remote computer 18 in step 900. In preferred forms, a dedicated remote computer or computers are provided for these pricing and marking steps of the inventory management method.

As illustrated in step 902, salesperson or operator first sorts the inventory to separate out items that require special attention during pricing. For example, items of art, electronics, or building materials are often priced and managed differently than other types of inventory.

The operator then scans or enters the information on the inventory label in step 904 and review the information stored in the inventory data record. This allows the operator to determine such things as the quantity of that particular type of inventory that was received.

The operators may decide to divide up boxes-of items into individual or package units that are more saleable in step 908. For example, distressed inventory warehouses often receive large boxes full of individual bars of soap. Since many consumers would rather purchase individual bars of soap rather than an entire carton, the inventory management method provides for the separating of the individual items into saleable units. This process is commonly referred to as "exploding".

After the inventory is exploded, a new "child" inventory data record is created with a number that relates to the original or "parent" inventory data record. The inventory management method then prompts the operators to fill in these new child data records with pricing information for the exploded items.

To assist the operator in pricing the individual saleable items, the items' UPC codes can be scanned or entered in step 910 to provide information which may be useful in pricing the item. The operator is also prompted to enter other information into the child inventory data record including the quantity and unit of measure of the item being priced, a detailed description of the item, the manufacturer of the product, a departmental code that 1000. The inventory management method then prompts the operator to scan the inventory label or enter the inventory numbers on the label for the items that are to be marked down or up. As described above, these inventory numbers can be entered in either the RF scanning devices 16 or the remote computers 18. The inventory management method then retrieves the appropriate inventory data record and displays on the terminal of the RF scanner or remote computer 18 the date the item was originally priced, the quantity of the item currently in the distressed inventory warehouse, the original price of the items, the product description, the product manufacturer, the most recent markdown/markup date if any, and the most recent markdown/markup price if any.

All of the above-described information can be used by the operator for determining a new price for the item. For example, if the operator learns that a large quantity of the item is currently in the distressed inventory warehouse and that recent markdown prices have failed to increase sales of the item, he or she can more drastically reduce the price to increase sales.

After the operator enters the inventory numbers for the inventory that is to be marked up or marked down, the inventory management method prompts the operator to enter a new price in step 1002. The inventory management method then prompts the operator to input a reason code for the adjustment in step 1004 and modifies and updates the appropriate inventory data record to reflect the new price in step 1006. Finally, new price tags with the new updated prices are printed and applied to the inventory in step 1008.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by letters patent includes the following:

We claim:

1. A method for matching and identifying lost inventory from a carrier that has been delivered to a warehouse, the method comprising:

designating at least one piece of the lost inventory as overgoods inventory;

generating overgoods information for each piece of the overgoods inventory, including descriptive product information, location information, and information about the carrier associated with the overgoods inventory;

inputting the overgoods information into at least one overgoods record in a computer;

searching the at least one overgoods record in the computer for records matching preselected criteria, including information about the carrier, to generate at least one matched overgoods record corresponding to matched overgoods inventory; and notifying the carrier that at least one matched overgoods record matches the preselected criteria.

2. The method of claim 1, further comprising the steps of identifying a current location of the corresponding piece of matched overgoods inventory from the location information in the matched overgoods record; and physically relocating the piece of matched overgoods inventory from the current location to a second location for shipment or further processing.

3. The method of claim 2, further comprising the step of printing, with a printer coupled with the computer, a ticket with shipping information for each piece of matched overgoods inventory prior to physically relocating the piece of matched overgoods inventory from the current location.

4. The method of claim 1, further comprising the step of displaying selected overgoods information on a computer screen for each matched overgoods record.

5. The method of claim 4, further comprising the steps of designating at least one matched overgoods record as an on-hold record after generating at least one matched overgoods record and displaying the on-hold designation on the computer screen when selected overgoods information is displayed on the computer screen for the corresponding matched overgoods record.

6. The method of claim 5, further comprising the steps of de-designating each on-hold record as an on-hold record;

identifying a current location of the corresponding piece of matched overgoods inventory from the location information in the matched overgoods record; and physically relocating the piece of matched overgoods inventory from the current location to a second location for shipment or further processing.

7. The method of claim 1, further comprising the steps of:

printing a machine-readable overgoods identification label for each piece of overgoods inventory with a printer coupled with the computer, the label having an overgoods inventory code associated with its respective overgoods record; and placing the overgoods identification labels on their respective piece of overgoods inventory.

8. The method of claim 7, further comprising the step of updating the current location in the location information for each piece of overgoods inventory by inputting the overgoods inventory code into a programmable input device in communication with the computer when the current location changes.

9. The method of claim 1, wherein the step of searching the overgoods records further includes restricting access to selected records based on a log in code supplied by a user of the computer.

10. The method of claim 1, further comprising the step of displaying a selected portion of the matched overgoods record on a display device in communication with the computer.

11. The method of claim 10, wherein the step of displaying a selected portion of the matched overgoods record includes allowing a user of the computer to view the entire matched overgoods record.

12. The method of claim 1, wherein the step of receiving overgoods information further comprises the step of receiving a digital image of the overgoods inventory into the overgoods record.

13. The method of claim 12, further comprising the step of allowing a user of the computer to view the digital image of the matched overgoods inventory associated with the matched record after identification of the matched record.

14. The method of claim 1, further comprising the step of physically relocating each piece of overgoods inventory to an overgoods inventory storage area after designation of the distressed inventory as overgoods inventory.

15. A method for managing overgoods inventory with the aid of a computer, the method comprising:

designating a plurality of pieces of inventory as overgoods inventory;

generating overgoods information for each piece of overgoods inventory, including descriptive product information, location information, and information about a carrier associated with the overgoods inventory;

inputting the overgoods information into an overgoods record in a computer;

searching the overgoods records in the computer for records matching preselected criteria;

identifying records that do not match the preselected criteria and that have been in the computer for a preselected length of time as stale records;

designating the overgoods inventory associated with each stale record as a matured item; and physically relocating each matured item for release to a salvage process.

16. A method for managing inventory for which delivery to an intended destination has not been made, comprising:

identifying a shipper from which the inventory was acquired;

receiving descriptive product information, including shipper information, for the inventory into records in a computer database;

returning the inventory to the shipper for appropriate disposition;

searching the database for records matching preselected criteria provided by a requesting party corresponding to inventory that did not arrive at its intended destination; and providing to the requesting party the descriptive product information, including date returned to the shipper, for the inventory records matching the preselected criteria.

17. The method of claim 16, wherein the step of providing information to the requesting party includes providing sufficient information to demonstrate that claims against a carrier of the inventory for loss of the inventory are inappropriate.

18. A method for managing inventory for which consignee information is not known, with the aid of a computer, comprising identifying a shipper from which the inventory was acquired;

receiving descriptive product information, including shipper information, for the inventory into records in a computer database;

returning the inventory to the shipper for appropriate disposition;

searching the database for records matching preselected criteria provided by the shipper corresponding to inventory that did not arrive at its intended destination; and providing to the shipper the descriptive product information, including date returned to the shipper, for the inventory records matching the preselected criteria, enabling the shipper to physically identify the inventory corresponding to the matching records.

* * * * *